United States Patent
Ide et al.

(10) Patent No.: US 9,267,469 B2
(45) Date of Patent: Feb. 23, 2016

(54) STRADDLE-TYPE VEHICLE AND METHOD OF MANUFACTURING THE SAME

(71) Applicants: YAMAHA HATSUDOKI KABUSHIKI KAISHA, Iwata-shi, Shizuoka (JP); KABUSHIKI KAISHA YAMATO SEISAKUSYO, Hamamatsu-shi, Shizuoka (JP)

(72) Inventors: Shinnosuke Ide, Shizuoka (JP); Masatomo Nagumo, Shizuoka (JP); Yuya Yamada, Shizuoka (JP)

(73) Assignees: KABUSHIKI KAISHA YAMATO SEISAKUSYO, Shizuoka (JP); YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/210,677

(22) Filed: Mar. 14, 2014

(65) Prior Publication Data
US 2014/0262572 A1 Sep. 18, 2014

(30) Foreign Application Priority Data

Mar. 15, 2013 (JP) .................. 2013-053548

(51) Int. Cl.
*B60K 13/02* (2006.01)
*F02M 35/02* (2006.01)
*F02M 35/16* (2006.01)
*B62K 11/04* (2006.01)
*F02M 19/00* (2006.01)
*F02B 61/02* (2006.01)
*B60K 15/063* (2006.01)
(Continued)

(52) U.S. Cl.
CPC ............ *F02M 35/0202* (2013.01); *B60K 13/02* (2013.01); *F02M 35/0204* (2013.01); *F02M 35/02416* (2013.01); *F02M 35/162* (2013.01); *B60K 15/063* (2013.01); *B62K 11/04* (2013.01); *F02B 61/02* (2013.01); *F02M 19/00* (2013.01); *F02M 35/02425* (2013.01); *F02M 35/02458* (2013.01); *F02M 35/02491* (2013.01); *F02M 35/10006* (2013.01); *F02M 35/10032* (2013.01); *F02M 35/10216* (2013.01)

(58) Field of Classification Search
None
See application file for complete search history.

(56) References Cited

U.S. PATENT DOCUMENTS

| | | | | | |
|---|---|---|---|---|---|
| 5,205,244 | A | * | 4/1993 | Nakamura | ............. F02B 61/02 123/184.42 |
| 5,301,767 | A | * | 4/1994 | Shiohara | ................ B60K 13/06 180/219 |
| 5,577,570 | A | * | 11/1996 | Shiohara | .................. B62J 17/00 180/219 |

(Continued)

FOREIGN PATENT DOCUMENTS

JP 63-128262 U 8/1988

*Primary Examiner* — Brodie Follman
*Assistant Examiner* — Hilary L. Johns
(74) *Attorney, Agent, or Firm* — Keating and Bennett, LLP

(57) ABSTRACT

A motorcycle includes a body frame, an engine, a lead-in duct, and an air cleaner case. An air cleaner includes a convex cleaner element protruding in a direction opposite to a direction extending toward the lead-in duct, and a convex support frame that supports the inner surface of the cleaner element. The support frame includes an outer frame that supports a periphery of the cleaner element. The cleaner element includes a convex element body and a seal provided adjacent the peripheral edge of the element body to project toward the inner surface of the element body so as to work together with the periphery of the element body to hold the outer frame. The periphery of the element body has a smaller thickness than the other portions of the element body.

11 Claims, 13 Drawing Sheets

(51) Int. Cl.
*F02M 35/10* (2006.01)
*F02M 35/024* (2006.01)

(56) References Cited

U.S. PATENT DOCUMENTS

| | | | | |
|---|---|---|---|---|
| 5,860,405 | A * | 1/1999 | Muramatsu | F02B 61/02 123/184.56 |
| 6,142,123 | A * | 11/2000 | Galasso | B62M 7/02 123/486 |
| 6,276,482 | B1 * | 8/2001 | Moriya | B62J 17/02 180/229 |
| 6,409,783 | B1 * | 6/2002 | Miyajima | F02M 35/04 123/198 E |
| 6,422,332 | B1 * | 7/2002 | Takata | F02B 61/02 123/41.01 |
| 6,695,088 | B2 * | 2/2004 | Schroeder | B62J 17/00 180/229 |
| 7,380,624 | B2 * | 6/2008 | Momosaki | F02M 35/10013 180/68.3 |
| 7,513,328 | B2 * | 4/2009 | Shigeta | B62J 17/02 180/225 |
| 7,681,678 | B2 * | 3/2010 | Shiraishi | B62K 11/04 180/68.3 |
| 7,766,119 | B2 * | 8/2010 | Yokoi | F02M 35/10032 180/311 |
| 7,963,358 | B2 * | 6/2011 | Buell | B62J 35/00 180/225 |
| 8,006,791 | B2 * | 8/2011 | Nakagome | B62J 17/02 180/219 |
| 8,146,693 | B2 * | 4/2012 | Oohashi | B60K 13/02 180/68.3 |
| 8,157,041 | B2 * | 4/2012 | Kawai | B62K 11/04 180/68.1 |
| 8,181,729 | B2 * | 5/2012 | Hiramatsu | B62K 11/04 180/68.1 |
| 8,413,754 | B2 * | 4/2013 | Matsuda | B62K 11/04 180/219 |
| 8,567,542 | B2 * | 10/2013 | Shiina | B62M 7/00 123/184.21 |
| 2010/0314188 | A1 * | 12/2010 | Goto | 180/219 |
| 2010/0319666 | A1 * | 12/2010 | Usukura et al. | 123/631 |
| 2012/0061159 | A1 * | 3/2012 | Katsuno | B62J 99/00 180/68.3 |
| 2014/0123942 | A1 * | 5/2014 | Tanaka | 123/403 |
| 2014/0262571 | A1 * | 9/2014 | Murayama | 180/68.3 |
| 2014/0262572 | A1 * | 9/2014 | Ide et al. | 180/68.3 |

* cited by examiner

STRADDLE-TYPE VEHICLE AND METHOD OF MANUFACTURING THE SAME

BACKGROUND OF THE INVENTION

1. Field of the Invention

The present invention relates to straddle-type vehicles including an air cleaner that supplies clean air to the engine.

2. Description of the Related Art

Straddle-type vehicles including an air cleaner for supplying clean air to the engine are known. In such a straddle-type vehicle, as disclosed in Japanese Utility Model Application Publication No. JP S63-128262, an element holder is attached by a screw to a fixing means fixed to the surrounding edge of the opening of the induction passage. A cup-shaped air cleaner element is mounted on the element holder to cover its outer side.

In the arrangement disclosed in Japanese Utility Model Application Publication No. JP S63-128262, the element holder includes an engagement portion for engaging with a seal of the fixing means. In the area of this engaging portion, the edge of the air cleaner element is tucked into its inner side. Thus, as the element holder with the air cleaner element attached to it is attached to the fixed means by a screw, as discussed above, the edge of the air cleaner element is sandwiched by the element holder and the seal of the fixing means.

In the case of a convex solid cleaner element, such as the air cleaner element disclosed in Japanese Utility Model Application Publication No. JP S63-128262, the support frame for supporting the cleaner element is formed by a frame member with an outer frame. As such, the outline of the cleaner element, defined by the periphery of the cleaner element adjacent to which the outer frame of the support frame is located, is dependent on the diameter of the outer frame of the support frame and the thickness of the cleaner element. The design of the outer frame of the support frame is dependent on the desired strength and the size of the opening in which the cleaner element is located, for example. The thickness of the cleaner element is dependent on the desired air cleaning functionality and durability. Since the dimensions of the outline defined by the periphery of the cleaner element depend on the performance and other properties, it is difficult to reduce the size of the air cleaner.

The thickness of the portions of the air cleaner adjacent to which the outer frame of the support frame is located may be reduced by providing a separate member made of rubber, for example, that has no air cleaning function at the periphery of the cleaner element. However, such an arrangement has a smaller region that possesses the function of a cleaner element, resulting in reduced air cleaning functionality of the air cleaner.

SUMMARY OF THE INVENTION

Preferred embodiments of the present invention achieve a reduced size of an air cleaner while ensuring a certain induction area of the cleaner element to maintain a certain air cleaning functionality of the air cleaner.

A straddle-type vehicle according to a preferred embodiment of the present invention includes an engine; a lead-in duct including one end connected with the engine and another end including an opening; an air cleaner case connected with the opening of the lead-in duct; a convex cleaner element protruding in the direction opposite the direction toward the lead-in duct, the cleaner element located in the air cleaner case and covering the opening; and a support frame that supports the cleaner element. The cleaner element includes a convex element body and a seal protruding from the periphery of the element body toward the inner side of the element body. The support frame includes an outer frame contacting the periphery of the element body to push the seal onto the surrounding edge of the opening. The periphery of the element body has a thickness smaller than that of the portions of the element body that are located inward of the outer frame as viewed in a direction of the protrusion of the element body (first arrangement).

In such a straddle-type vehicle, the outer frame of the support frame is located outward of the opening of the lead-in duct. The periphery of the convex element body, that is to be contacted by the outer frame of the support frame, has a thickness smaller than the thickness of the portions of the element body that are located inward of the outer frame as viewed in a direction of the protrusion of the element body. Thus, even if a convex cleaner element is used, the increase in the size of the outline of the air cleaner case is prevented while maintaining a certain opening area of the opening of the lead-in duct. Moreover, the periphery of the element body, adjacent to which the outer frame of the support frame is located, also has the function of cleaning air. Thus, the size of the air cleaner is significantly reduced but is still able to maintain a certain air cleaning functionality of the air cleaner.

Starting from the first arrangement, the straddle-type vehicle further includes a head pipe; left and right main frames, to the left and right, extending rearward from the head pipe; and a fuel tank supported by the left and right main frames. The engine is supported by the left and right main frames. The air cleaner case is located between the head pipe and the fuel tank. The opening is located between the left and right main frames. The cleaner element is larger than the opening in a plan view (second arrangement).

In such a straddle-type vehicle, the opening of the lead-in duct is located between the left and right main frames. As such, there are limitations on the size of the opening of the lead-in duct, even when one attempts to increase it. Further, even when the lead-in duct has an opening that is as large as possible, the engine performance may decrease if a portion of the cleaner element (for example, the seal) blocks a portion of the opening.

Further, the air cleaner case is located between the head pipe and fuel tank. Thus, if the size of the outline of the air cleaner case is increased, this results in a smaller capacity of the fuel tank as measured in a front-to-rear direction with respect to the vehicle. Furthermore, the size of the air cleaner and fuel tank measured in a vehicle width direction is increased, making the feet of the rider feel uncomfortable.

Under these restrictions on the position of the air cleaner, the thickness of the periphery of the cleaner element preferably is smaller than the thickness of the portions of the element located inward of the outer frame, as in the other preferred embodiment described above, in order to reduce the size of the air cleaner while keeping the opening area of the opening as large as possible.

Preferably, the seal includes a holding portion that works together with the periphery of the element body to hold the outer frame (third arrangement). Thus, the cleaner element is attached to the support frame in a simple manner. Consequently, the cleaner element may be replaced in a simple manner.

The element body preferably is defined by a single component including the periphery and the portions of the element body that are located inward of the outer frame. Thus, the periphery of the element body and the portions of the element body located inward of the outer frame can be provided without an additional step of bonding, for example.

Further, in implementations where the periphery is defined by a separate member, a separate mold must be fabricated; in contrast, forming the periphery and the other portions of the element body as a single component, as described above, results in a reduced cost of fabricating molds.

Preferably, the air cleaner case includes a mount. The element body includes a fixing portion fixed to the mount together with the support frame. The periphery of the element body has a smaller thickness than the portions thereof other than itself and the fixing portion when the element body, together with the support frame, is fixed to the mount.

As the periphery of the element body has a smaller thickness than that of the portions thereof other than itself and the fixing portion of the element body, the size of the cleaner element as measured when the cleaner element is supported by the support frame is significantly reduced.

The air cleaner case preferably includes an air induction cover covering the cleaner element. The air induction cover includes a cover body defining an accommodation space that accommodates the cleaner element, and an induction duct configured to forward air into the accommodation space. The induction duct includes an inlet port with an opening located forward of the cover body with respect to the vehicle.

Typically, in implementations where air is taken in from the front of the vehicle, the air cleaner is located forward of the engine with respect to the vehicle. Thus, the air cleaner must be positioned in an area that only has a small space. In such implementations, an air cleaner of a small size may be advantageously realized without reducing the air cleaning functionality of the air cleaner if the periphery of the element body, adjacent to which the outer frame of the support frame is located, has a smaller thickness than that of the portions of the element body located inward of the outer frame.

The cleaner element preferably is trapezoidal or substantially trapezoidal, as viewed from above the vehicle, including oblique sides located along the sides of the vehicle and having a dimension as measured in a vehicle width direction that increases in a rearward direction with respect to the vehicle.

Thus, a cleaner element with a surface area that is as large as possible preferably is disposed in the gap between the pair of main frames. This will realize a cleaner element with a small size while ensuring a certain air cleaning functionality.

A pair of induction ducts are arranged in a vehicle width direction as viewed from above the vehicle. As viewed from above the vehicle, each of the pair of induction ducts is connected with one or the other side of the cover body such that one induction duct is opened toward one oblique side of the cleaner element and the other induction duct is opened toward the other oblique side of the cleaner element.

Thus, air is effectively taken in using a pair of induction ducts and guided effectively toward the cleaner element.

Preferably, the element body is made of a porous material so as to improve the air cleaning functionality of the air cleaner compared with implementations where a portion of the element body is formed of a material other than a porous material.

The element body preferably includes a plurality of element layers including a fine element layer and a coarse element layer having a larger mesh than the fine element layer. The fine element layer is located inward with respect to the element body and is thicker than the coarse element layer.

In a method of manufacturing a straddle-type vehicle according to a preferred embodiment of the present invention, the periphery of the element body is formed by hot swaging so as to have a thickness smaller than that of the other portions of the element body. Thus, the periphery of the element body is formed in a simple manner. Moreover, the convex element body is formed in a simple manner.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
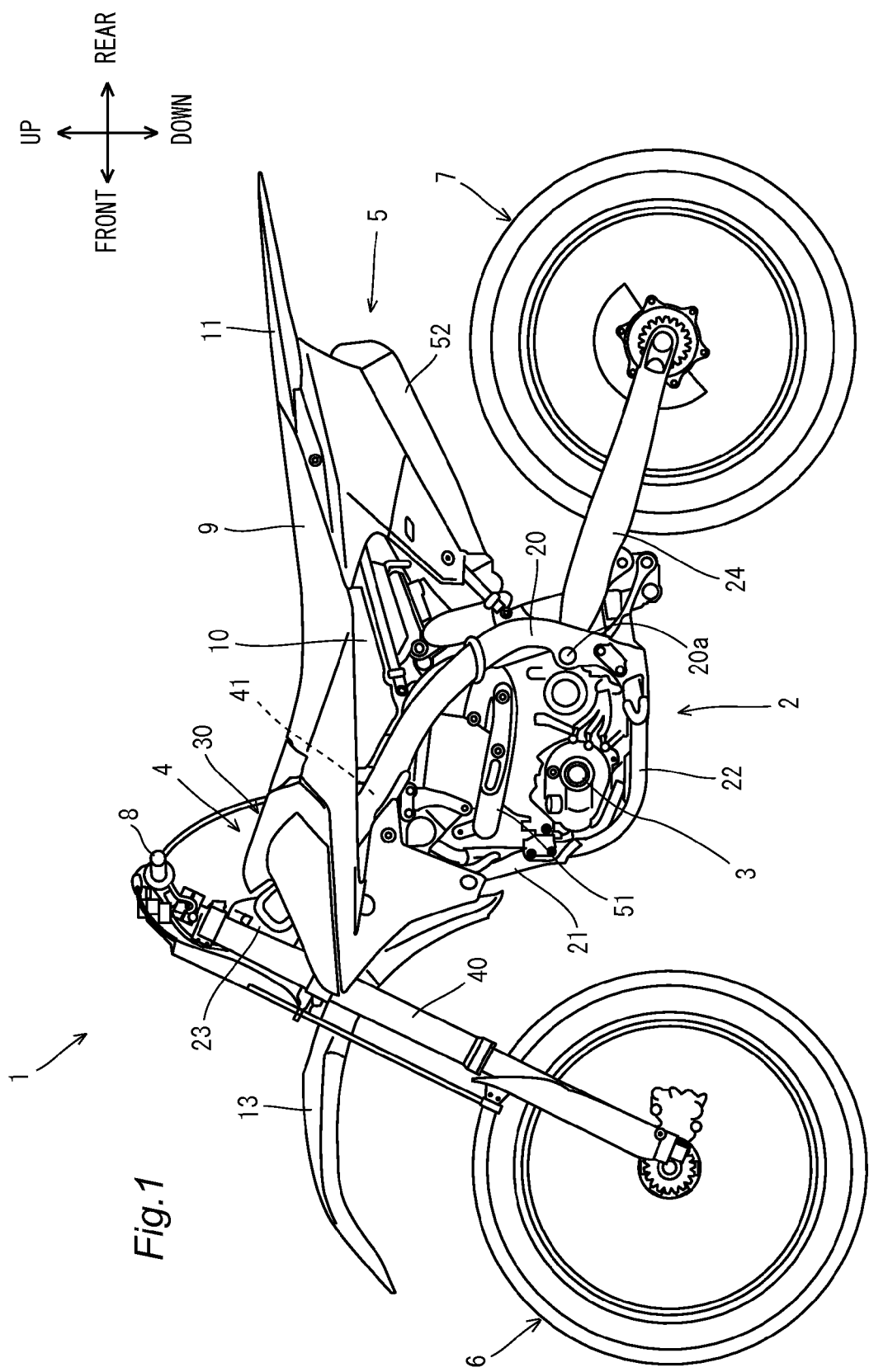
FIG. 1 is a schematic left side view of a motorcycle according to a preferred embodiment of the present invention.

Now, preferred embodiments will be described with reference to the drawings. The sizes of the components in the drawings do not exactly represent the sizes or size ratios of the actual components.

In the description below, "front/forward", "rear(ward)", "left" and "right" mean such directions as viewed from a rider grasping the handlebars 8 and sitting on the seat 9 of the motorcycle 1.

FIG. 1 schematically shows a motorcycle 1. FIG. 1 shows a left side view of the motorcycle 1. The motorcycle 1 preferably is a motocrosser designed to travel on uneven terrain, for example. The motorcycle 1 includes a "cradle" body frame 2, an engine 3, an air induction system 4, an exhaust system 5, a front wheel 6, a rear wheel 7, handlebars 8, seat 9, and a fuel tank 10.

The body frame 2 includes a pair of main frames 20, a down frame 21, a pair of bottom frame 22, a head pipe 23, and a pair of rear arms 24. As shown in FIG. 1, the head pipe 23 is located at a front portion of the motorcycle 1. The main frames 20 extend rearward from the head pipe 23, obliquely downwardly. The down frame 21 is located lower than the main frames 20 and extends downward and rearward from the head pipe 23. The bottom frame 22 connects the bottom end of the down frame 21 with the bottom ends of the main frames 20.

An air cleaner 30 of the air induction system 4 is located rearward of the head pipe 23. The construction of the air cleaner 30 will be described below. The seat 9 is located rearward of the air cleaner 30 and above the main frames 20. The seat 9 extends from behind the air cleaner 30 rearward with respect to the vehicle. The fuel tank 10 is located below a front portion of the seat 9. Positioning the fuel tank 10 below the seat 9 prevents the fuel tank 10 from being located above the air cleaner 30. This eliminates the necessity to remove the fuel tank 10 when conducting maintenance on the air cleaner 30, thus improving workability during maintenance on the air cleaner 30.

Figure 15:
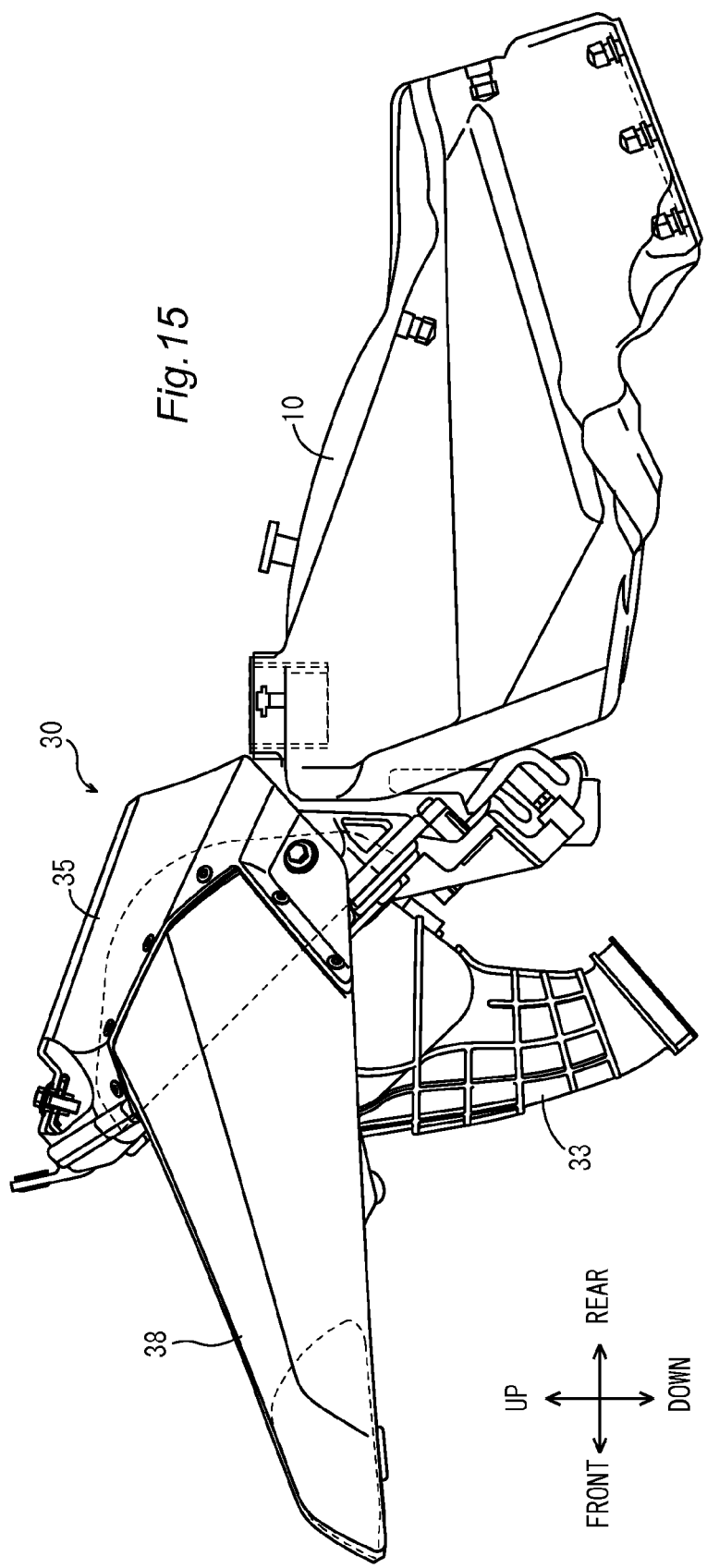
FIG. 15 is a left side view illustrating how the air cleaner is positioned relative to the fuel tank.

As shown in FIG. 15, the fuel tank 10 is located rearward of the air cleaner 30. As such, if an air cleaner 30 with a larger outline is provided, for example, a smaller fuel tank 10 as measured in a front-to-rear direction with respect to the vehicle must be provided, resulting in decreased capacity.

Figure 16:
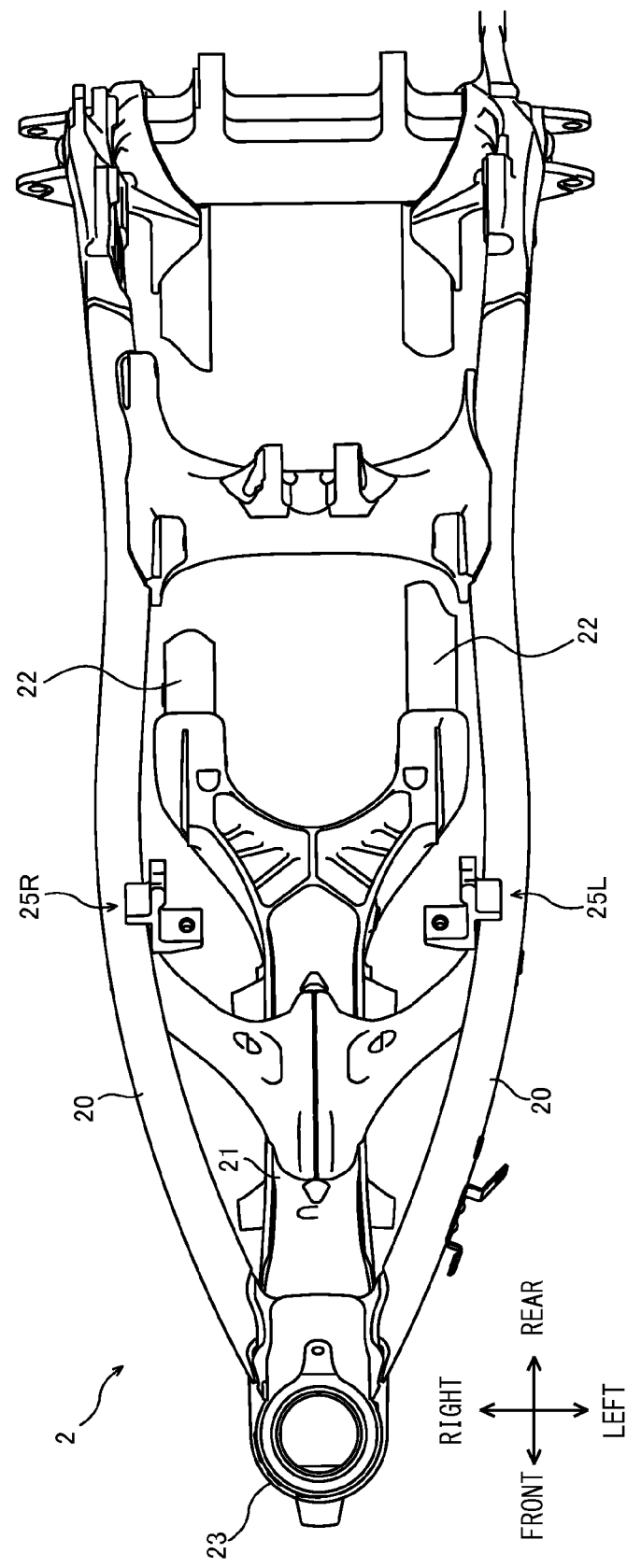
FIG. 16 is a top view illustrating how the brackets are disposed.
Figure 17:
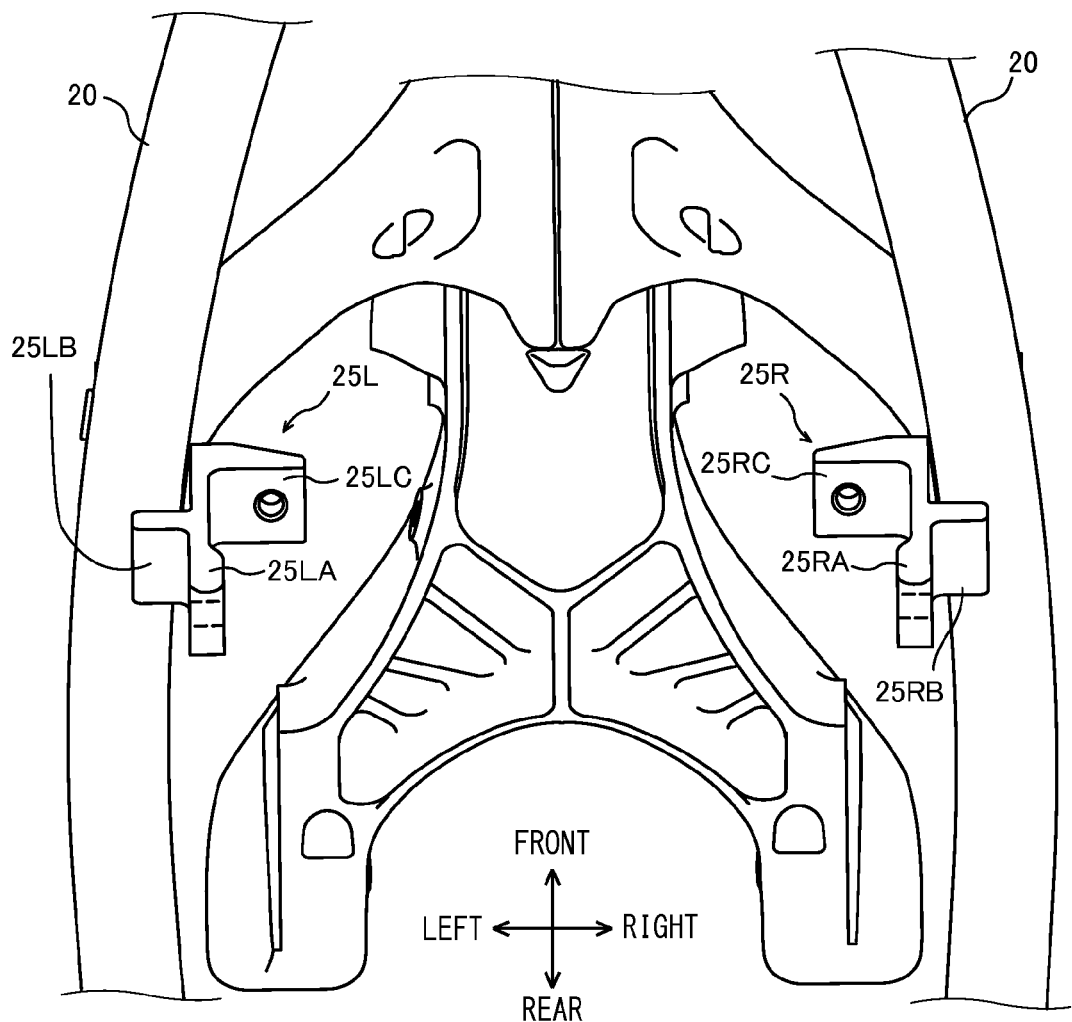
FIG. 17 is a partial enlarged view illustrating the brackets.

The fuel tank 10 is supported by L-shaped brackets 25L and 25R, each provided on the respective one of the main frames 20 (see FIGS. 16 and 17). Since the brackets 25L and 25R have the same construction, the construction of the bracket 25L will be mainly described below.

The bracket 25L includes a body 25LA, weld portion 25LB and attachment portion 25LC. The body 25LA is a plate extending in a top-to-bottom direction with respect to the associated main frame 20. The weld portion 25LB preferably is formed integrally with the body 25LA to protrude from the body 25LA outwardly as measured in a vehicle width direction. The weld portion 25LB is welded to the upper surface of the associated main frame 20. The attachment portion 25LC extends from the bottom end of the body 25LA toward the center of the vehicle as measured in a vehicle width direction. The body 25LA, weld portion 25LB and attachment portion 25LC preferably are integrally formed. Similar to the bracket 25L, the bracket 25R includes a body 25RA, weld portion 25RB and attachment portion 25RC that are preferably formed integrally.

Amount 31 of the air cleaner 30, described below, is fixed to the attachment portion 25LC of the bracket 25L and the attachment portion 25RC of the bracket 25R. The fuel tank 10 is attached to the top ends of the body 25LA of the bracket 25L and the body 25RA of the bracket 25R. That is, the air cleaner 30 and fuel tank 10 are fixed to the main frames 20 via the brackets 25L and 25R so as to be arranged in a front-to-rear direction with respect to the vehicle, as shown in FIG. 15.

As shown in FIG. 1, the engine 3 is located below the main frames 20 and rearward of the down frame 21. The engine 3 includes a throttle body 41 that is located at a front portion of the engine 3 and defines a portion thereof. An exhaust pipe 51 of the exhaust system 5 is connected with the rear side of the engine 3. As discussed below, the air cleaner 30 covers the opening 33a of the lead-in duct 33. The exhaust pipe 51 surrounds the engine 3 as viewed from above the vehicle. More specifically, the exhaust pipe 51 extends around the engine 3 in one loop and then rearward with respect to the vehicle. A silencer 52 is attached to the rear of the exhaust pipe 51. The engine 3 of the present preferred embodiment takes in air from the front and discharges gases toward the rear.

A pivot shaft 20a is provided at rear portions of the main frames 20. The rear arms 24 are supported by the pivot shaft 20a at their front ends so as to be swingable from top to bottom. The rear wheel 7 is rotatably attached to the rear ends of the rear arms 24. A rear fender 11 is located above the rear wheel 7.

The handlebars 8 are rotatably connected to the top of a steering shaft (not shown) located in the head pipe 23. A pair of front forks 40 is disposed along the steering shaft. More specifically, the pair of front forks 40 sandwiches the steering shaft and is disposed on both sides of the vehicle. As shown in FIG. 1, the front wheel 6 is rotatably attached to the bottom ends of the front forks 40. A front fender 13 is located above the front wheel 6.

Next, the construction of the air cleaner 30 will be described with reference to FIGS. 2 to 8.

Figure 2:
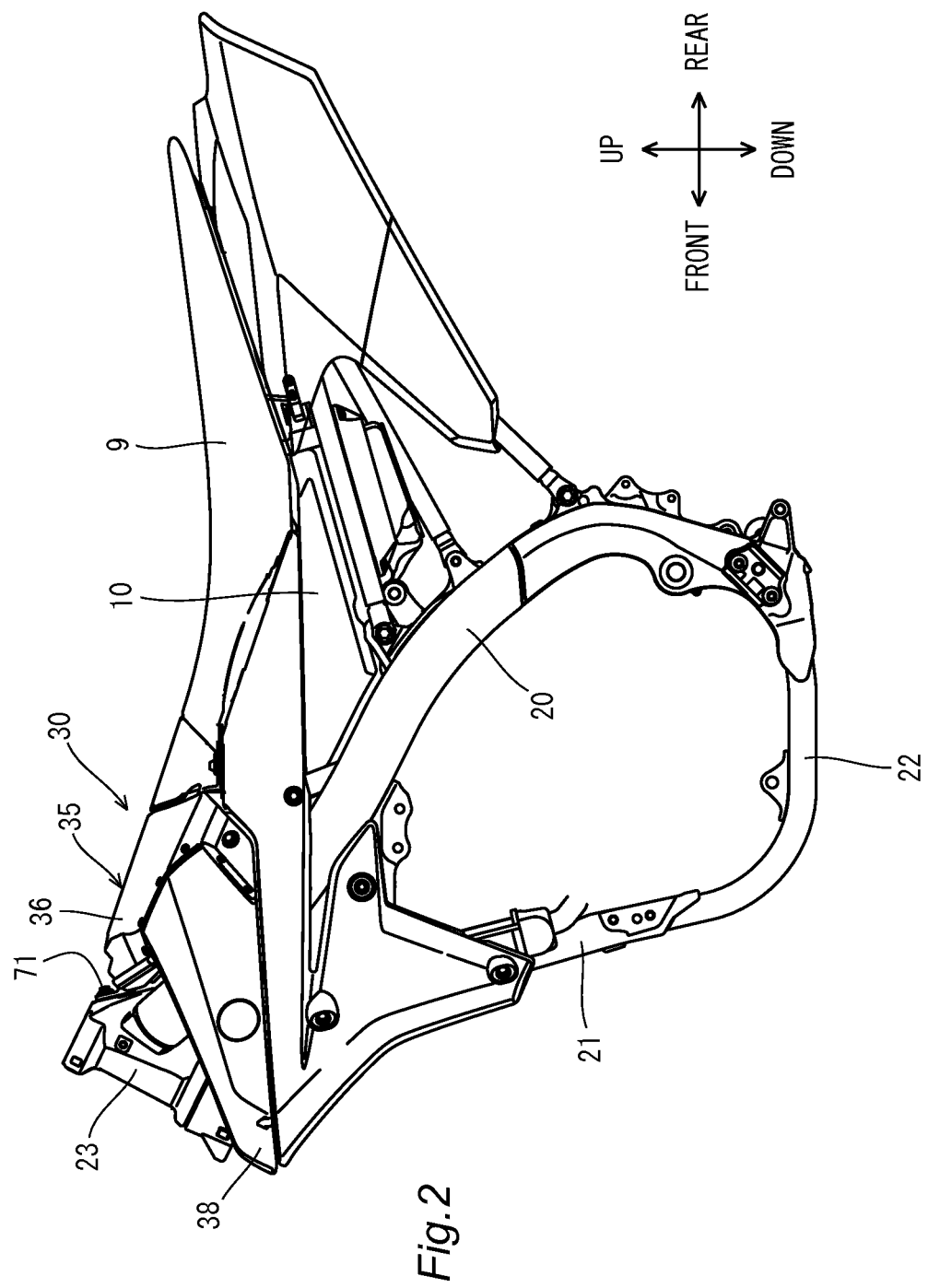
FIG. 2 is a left side view of the body frame with an air cleaner, seat and fuel tank attached to it.
Figure 3:
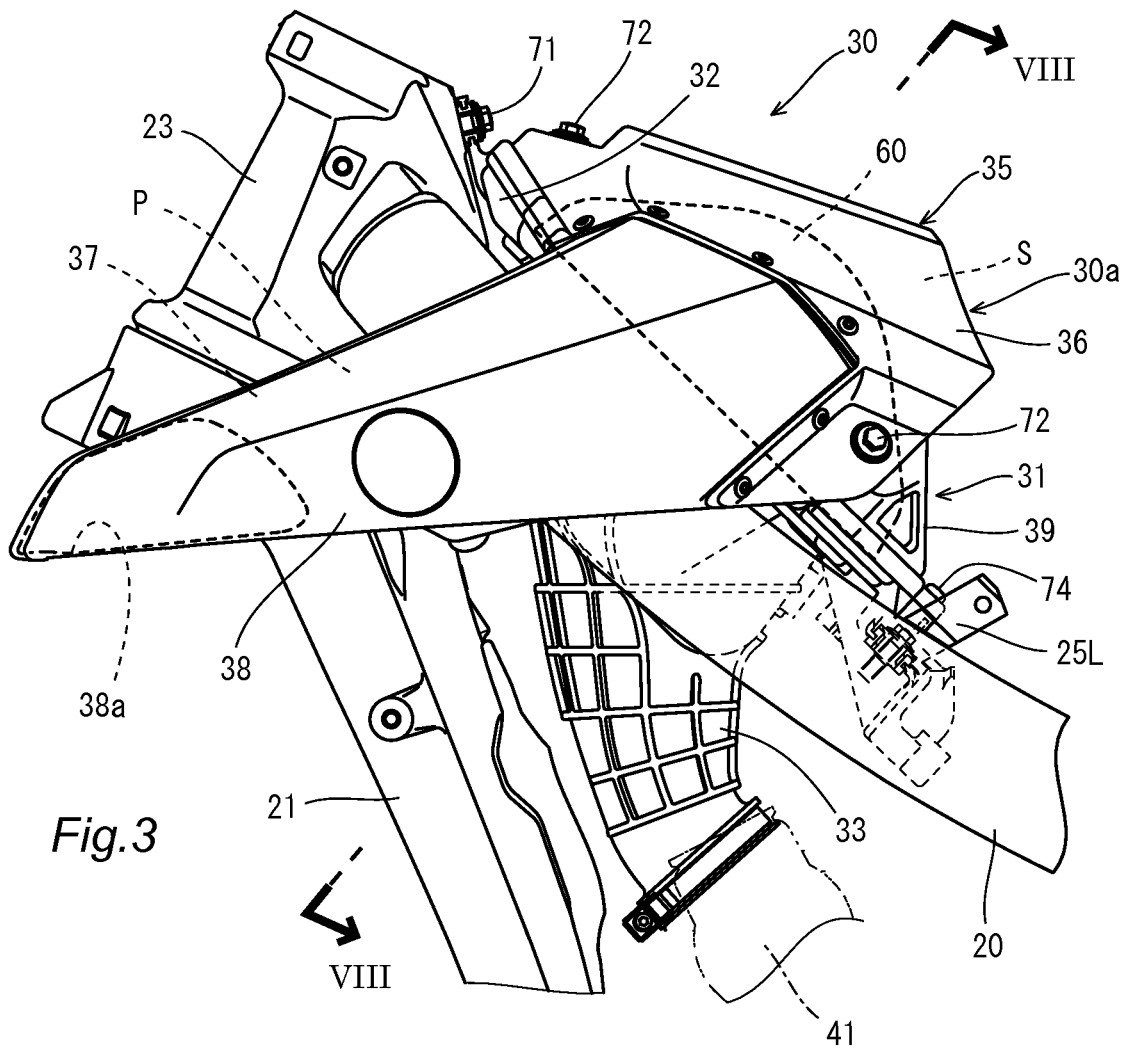
FIG. 3 is a side view illustrating how the air cleaner is disposed relative to the main frames and head pipe.

As shown in FIGS. 2 and 3, the air cleaner 30 is located between the head pipe 23 and seat 9. The air cleaner 30 is located on the main frames 20 and close to the head pipe 23. More specifically, the air cleaner 30 is located on the main frames 20 that are arranged in a vehicle width direction, and is fixed to the head pipe 23 by a bolt 71, for example.

Figure 5:
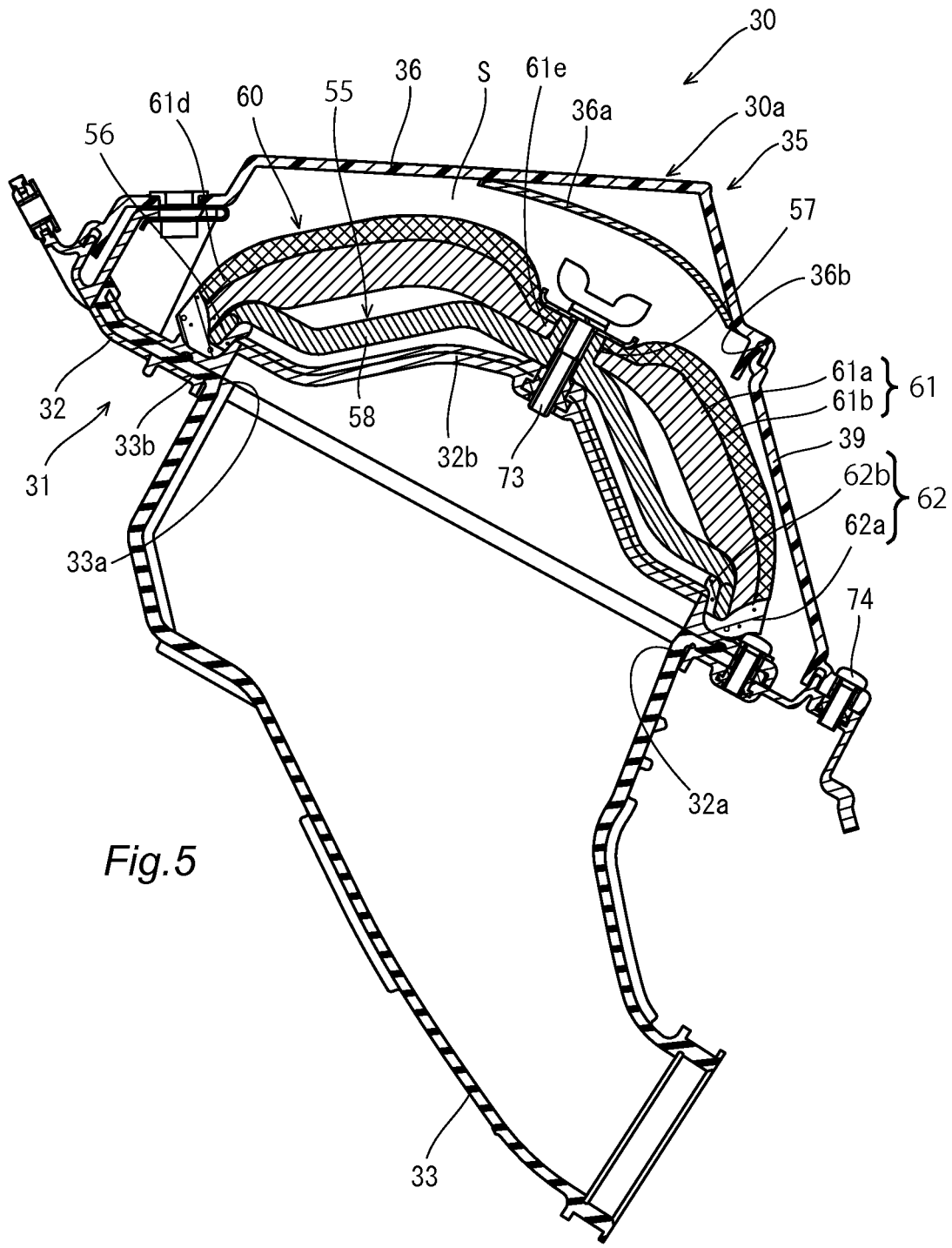
FIG. 5 is a cross-sectional view taken on line V-V of FIG. 4.

As shown in FIGS. 3 and 5, the air cleaner 30 includes a mount 31, air induction cover 35, rear cover 39 and cleaner element 60. The mount 31 is preferably made of resin and is fixed to the main frames 20. The mount 31 is connected with the throttle body 41 and holds the cleaner element 60 such that the element covers the opening 33a of the lead-in duct 33, described below.

More specifically, the mount 31 includes a base 32 configured to hold the cleaner element 60, and the lead-in duct 33 connected with the throttle body 41. The base 32 has a width that causes it to protrude outward in a vehicle width direction from the main frames 20 arranged in a vehicle width direction, as viewed from above the vehicle. The base 32 is fixed to the main frames 20. A front portion of the base 32 is fixed to the head pipe 23 by the bolt 71, for example. The air induction cover 35 is attached to the base 32 by a plurality of bolts 72, for example. As such, removing the bolts 72 allows the air induction cover 35 to be removed from the mount 31 in a simple manner.

The base 32, air induction cover 35 and rear cover 39 define an air cleaner case 30a. In other words, the air cleaner 30 includes the air cleaner case 30a and lead-in duct 33.

Figure 4:
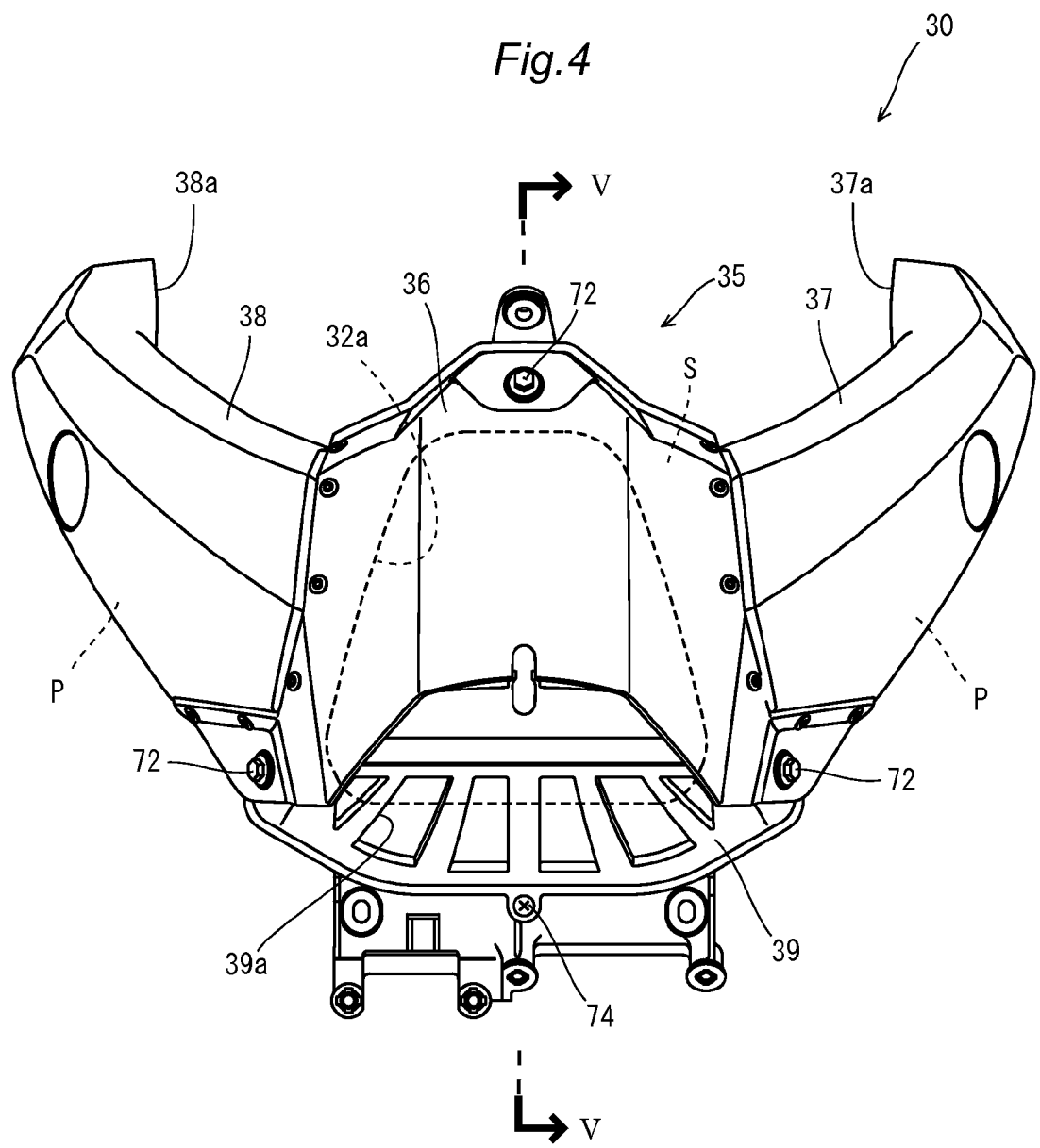
FIG. 4 is a plan view of the air cleaner.
Figure 6:
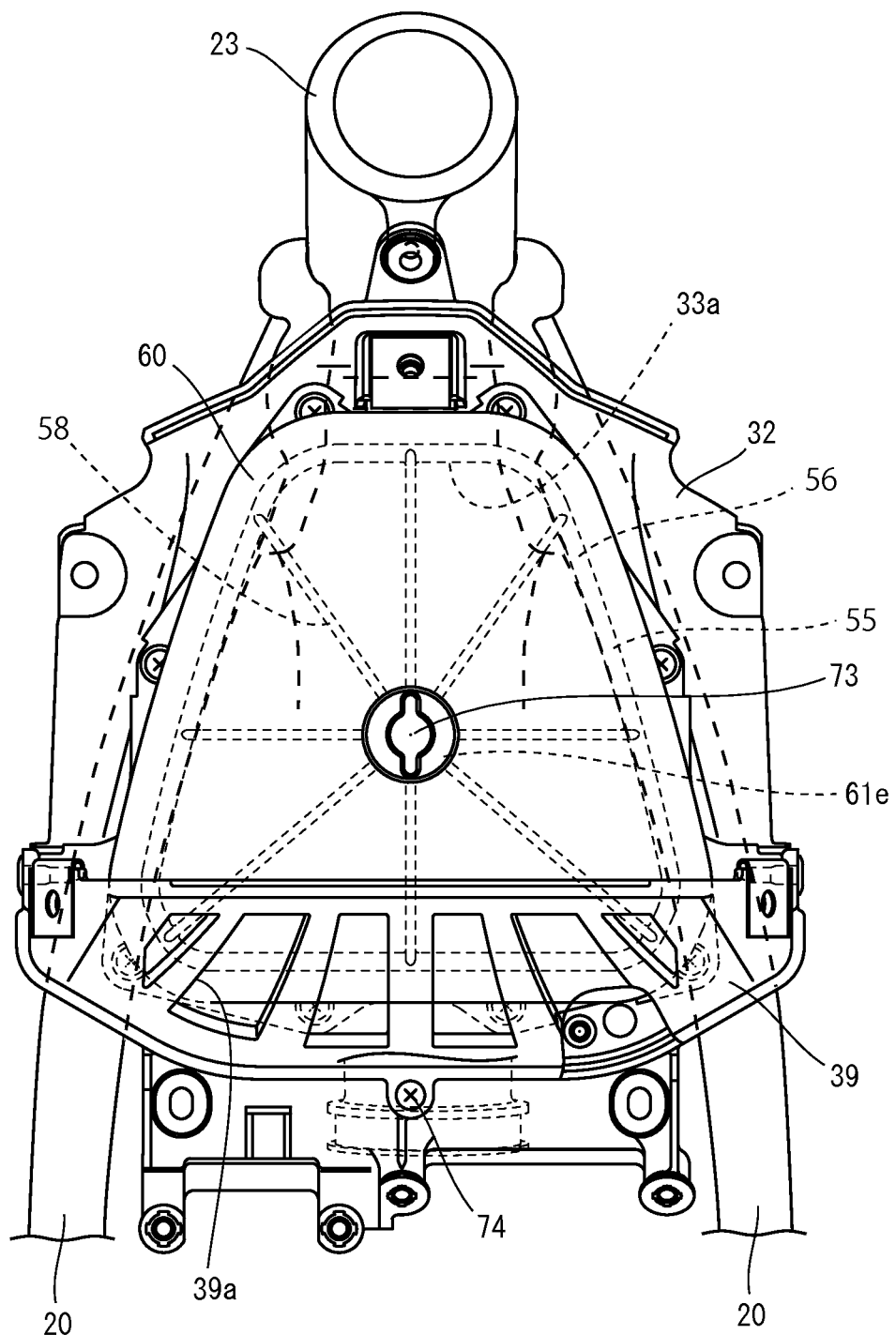
FIG. 6 is a view of the air cleaner without the air induction cover as viewed from above.

As shown in FIGS. 4 to 6, a trapezoidal or substantially trapezoidal aperture 32a is provided in the center of the base 32 as viewed from above the vehicle. The opening 33a of the lead-in duct 33, described below, is aligned with the aperture 32a. The cleaner element 60 is held on the base 32 by a support frame 55 made of resin, described below, so as to cover the opening 33a. The base 32 includes a frame support portion 32b made of resin that is in contact with the surrounding edge 33b of the opening 33a and straddles the opening 33a (see FIG. 5). The support frame 55 that holds the cleaner element 60 is fixed to the frame support portion 32b by a bolt 73, for example. In this way, the cleaner element 60 is fixed to the base 32. The frame support portion 32b preferably is formed integrally with an anti-flame net.

Figure 8:
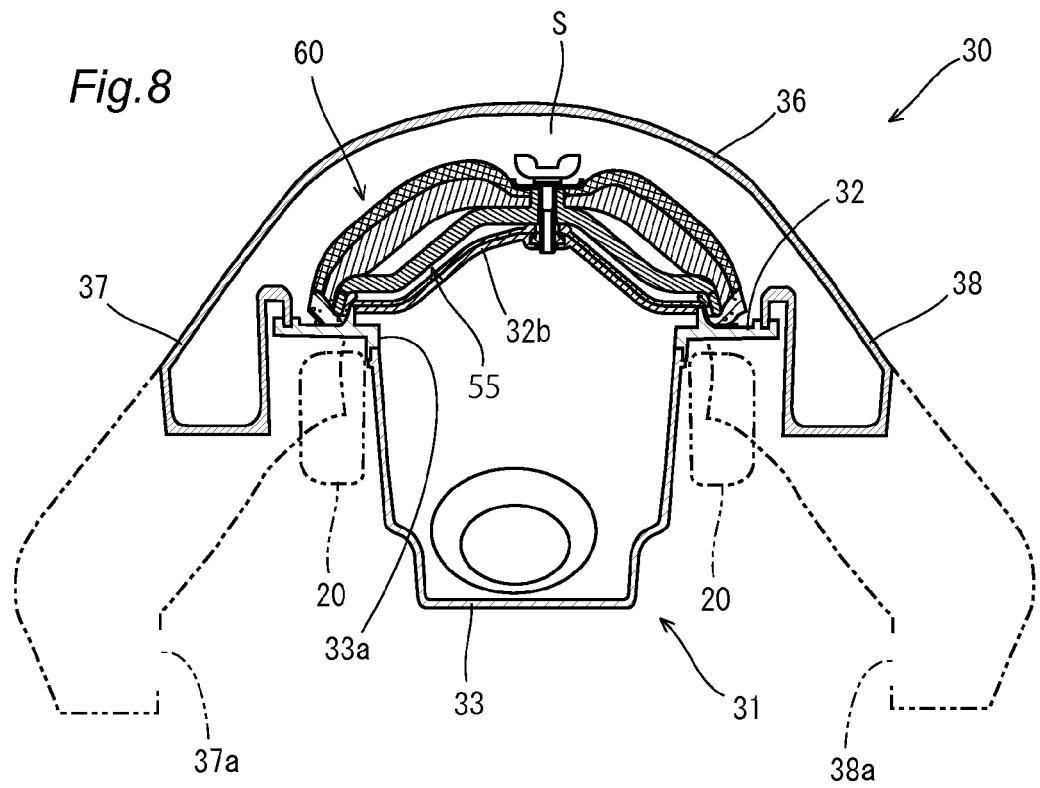
FIG. 8 is a cross-sectional view of the air cleaner case taken on line VIII-VIII of FIG. 3.

The lead-in duct 33 preferably is made of rubber and connects the base 32 with the throttle body 41. The lead-in duct 33 is a tube with one end connected with the throttle body 41 and the other end connected with the surrounding edge of the aperture 32a of the base 32. In other words, the opening 33a, which is located at the other end of the lead-in duct 33, is aligned with the aperture 32a of the base 32. As shown in FIG. 8, the aperture 33a is located between the main frames 20 arranged in a left-to-right direction. The cleaner element 60 covers the opening 33a. The lead-in duct 33 extends downward and rearward from the base 32.

As shown in FIGS. 3 to 5, the air induction cover 35 is made of resin and is located above the base 32 so as to define, in combination with the base 32 of the mount 31, an accommodation space S that accommodates the cleaner element 60. The air induction cover 35 also defines and serves as a duct that forwards air that has been taken in to the accommodation space S. More specifically, the air induction cover 35 includes a cover body 36 that defines the accommodation space S in combination with the base 32 of the mount 31, and a pair of induction ducts 37 and 38 connected with the cover body 36.

Figure 7:
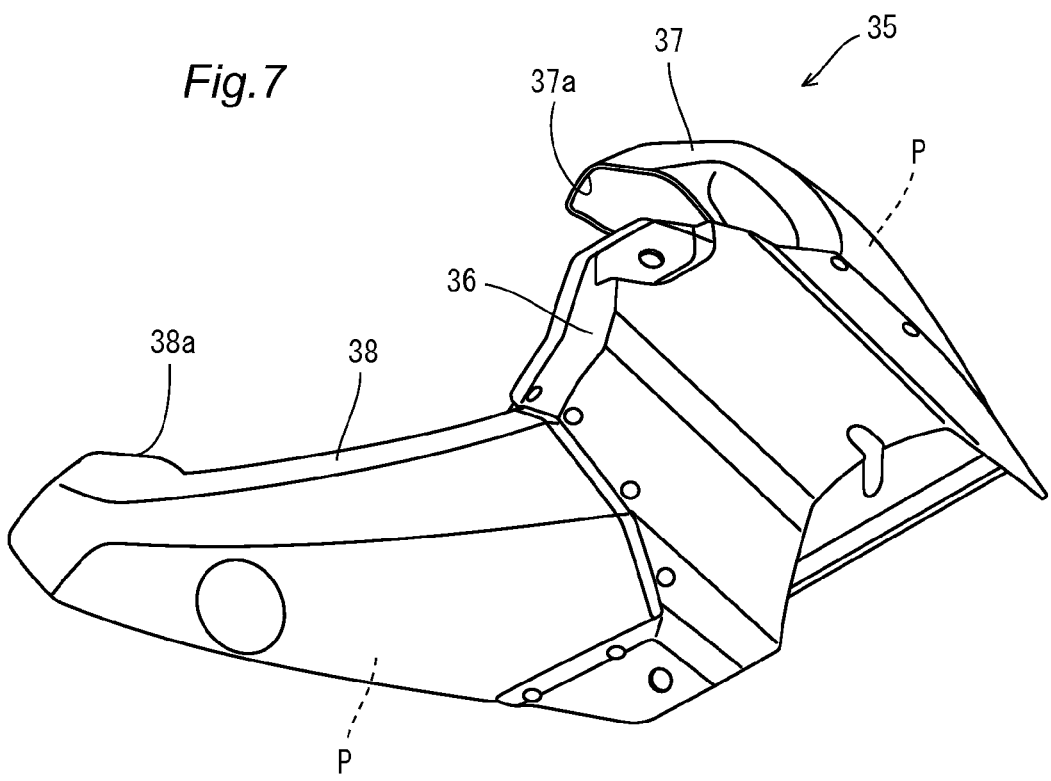
FIG. 7 is a schematic perspective view of the air induction cover.

As shown in FIGS. 4 and 7, the cover body 36 preferably is hexagonal or substantially hexagonal in a plan view. As shown in FIGS. 3 and 5, the cover body 36 is convex as viewed from a side of the vehicle such that the cover body and the base 32 of the mount 31 define the accommodation space S. A rear portion of the cover body 36 has a larger height than a front portion thereof such that the accommodation space S has a height that increases in a rearward direction with respect to the vehicle, in conformity with the shape of the cleaner element 60 which is convex, as discussed below. This configuration of the cover body 36 ensures the accommodation space S for the cleaner element 60, while allowing the upper surface of the cover body 36 connects smoothly with the upper surface of the seat 9 as viewed from a side of the vehicle, as shown in FIG. 2.

As shown in FIG. 5, a partition 36a is provided inside the cover body 36 to control the airflow within the accommodation space S. The partition 36a prevents air from flowing into an undesirable area inside the cover body 36. Thus, the partition 36a allows air flowing into the accommodation space S to flow effectively toward the cleaner element 60. In addition, the space between the cover body 36 and partition 36a serves as a sound insulator, i.e. prevents sounds generated as the air cleaner takes in air from being perceptible to the rider.

As shown in FIG. 5, a front portion of the cover body 36 is connected with a front portion of the base 32, while a rear portion of the cover body 36 is connected with the rear cover 39. A rear portion of the rear cover 39 is fixed to the base 32 by a bolt 74, for example, while a front portion thereof is connected with the cover body 36. The front portion of the rear cover 39 is connected with a rear portion of the cover body 36 as it is inserted into a groove 36b formed in the rear portion of the cover body 36. This configuration allows the cover body 36 to be easily removed from and mounted on the rear cover 39. As the cover body 36 is connected with the rear cover 39 as described above, the rear cover 39, together with the cover body 36, defines the accommodation space S in combination with the base 32 of the mount 31. A plurality of slits 39a are provided in the rear cover 39 (see FIGS. 4 and 6).

As shown in FIGS. 4 and 7, the induction ducts 37 and 38 are connected with the respective sides of the cover body 36 disposed in a vehicle width direction. The induction ducts 37 and 38 include a right induction duct 37 connected with the right side of the cover body 36, and a left induction duct 38 connected with the left side of the cover body 36. The right and left induction ducts 37 and 38 extend from the cover body 36 outwardly as measured in a vehicle width direction and forwardly. As shown in FIG. 3, the right and left induction ducts 37 and 38 sandwich the main frames 20 and head pipe 23 in a vehicle width direction. Thus, the right and left induction ducts 37 and 38 extend forward as viewed from a side of the vehicle.

As shown in FIGS. 3, 4 and 7, each of the right and left induction ducts 37 and 38 defines a passage, P, through which air can flow. The right and left induction ducts 37 and 38 include inlet ports 37a and 38a, each of which is located at a front portion of the associated duct toward the center of the vehicle. Air can flow in through the inlet ports 37a and 38a, and flow through the passages P of the right and left induction ducts 37 and 38.

Inflow ports, not shown, are provided, one at the connection between the right induction duct 37 and cover body 36 and another at the connection between the left induction duct 38 and cover body 36. More specifically, as viewed from above the vehicle, an inflow port is provided on the right side of the cover body 36, where air taken in through the right induction duct 37 can flow into this inflow port; and another inflow port is provided on the left side of the cover body 36, where air taken in through the left induction duct 38 can flow into this inflow port. These inflow ports allow air to flow toward the long sides of the cleaner element 60, described below. Thus, air may flow effectively from the right and left induction ducts 37 and 38 toward the cleaner element 60.

As the inlets ports 37a and 38a are provided at the front portions of the right and left induction ducts 37 and 38, respectively, cool air present forward of the engine 3 and radiator (not shown) with respect to the vehicle is effectively taken in.

The construction of the cleaner element 60 and support frame 55 will now be described with reference to FIGS. 5, 6 and 9 to 14.

The cleaner element 60 may be made of, for example, a porous material formed by foaming a resin material and removing foam film. The cleaner element 60 filters out dust or the like contained in the air taken in by the air induction cover 35. The cleaner element 60 of the present preferred embodiment preferably is a so-called wet element impregnated with oil or the like. Alternatively, the cleaner element may be a dry element.

Figure 9:
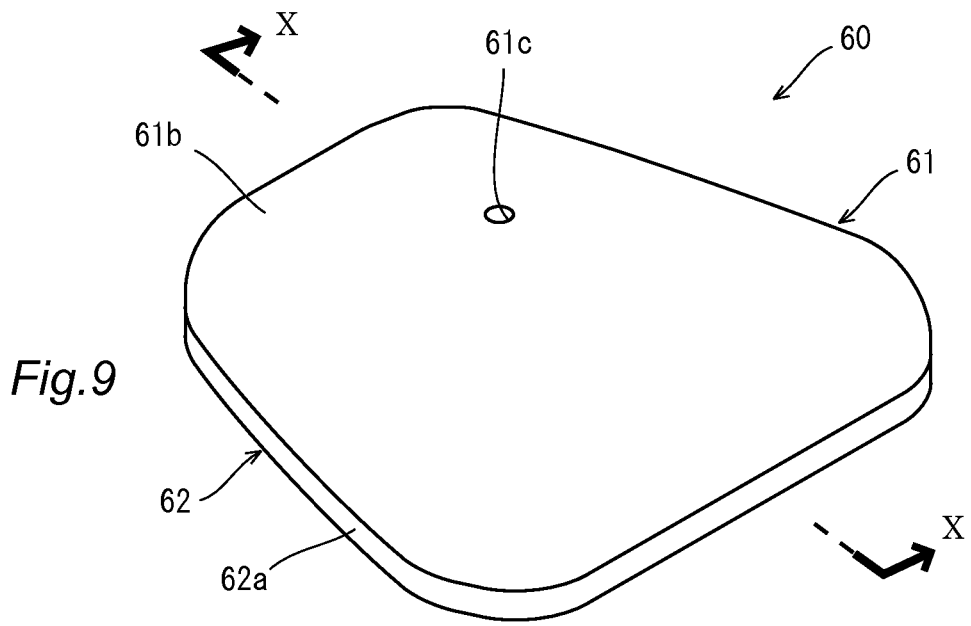
FIG. 9 is a schematic perspective view of the cleaner element.

As shown in FIGS. 6 and 9, the cleaner element 60 preferably is trapezoidal or substantially trapezoidal as viewed from above the vehicle. Also, the cleaner element 60 is convex, protruding from one side thereof. Such a convex cleaner element 60 is capable of allowing a larger amount of air to flow therethrough more effectively than an element having the shape of a flat plate.

Figure 10:
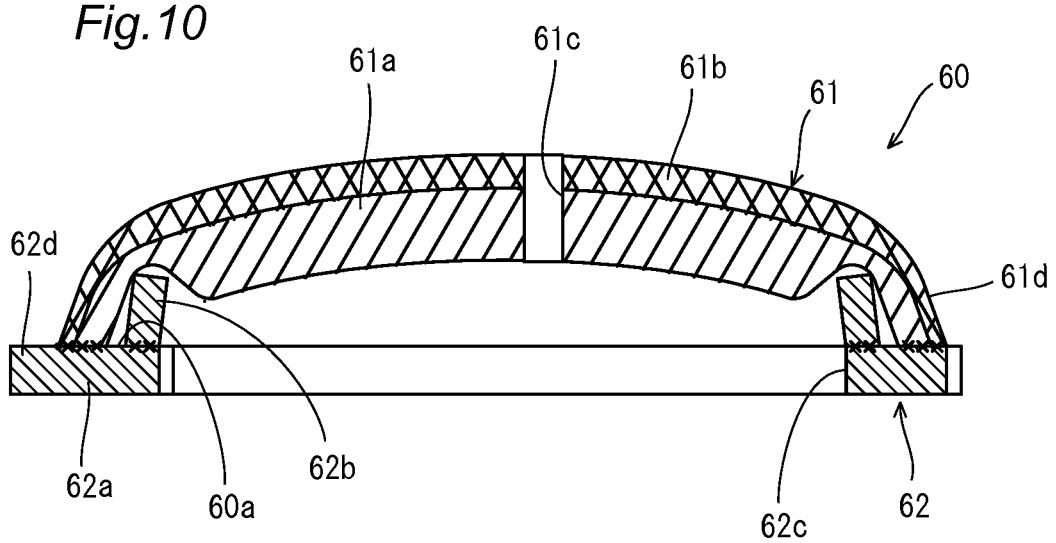
FIG. 10 is a cross-sectional view of the cleaner element taken on line X-X of FIG. 9.

The cleaner element 60 includes an element body 61 and a seal 62. As shown in FIG. 10, the element body 61 includes a fine element layer 61a with a fine mesh, and a coarse element layer 61b that has a larger mesh than the fine element layer 61a. The fine and coarse element layers 61a and 61b may be made of, for example, an ester-based urethane foam. In the element body 61, the coarse element layer 61b is deposited on the fine element layer 61a such that the fine element layer 61a is located inside. The fine element layer 61a has a larger thickness than the coarse element layer 61b.

The element body 61 includes a through-hole 61c in its center in a plan view, where the bolt 73 may pass through the hole to fix the support frame 55, described below, to the frame support portion 32b of the base 32. The through-hole 61c extends through both the fine element layer 61a and coarse element layer 61b.

The periphery 61d of the element body 61 has a smaller thickness than the other portions thereof. This is because the periphery 61d of the element body 61 is preferably formed by hot swaging to have a smaller thickness. In the present preferred embodiment, hot swaging is used to form a convex element body 61 protruding from one side, as in FIGS. 9 and 10. Hot swaging involves deforming a component to be molded using a mold, and then heating the component to complete the formation. In the present preferred embodiment, to form the element body 61, a plurality of mold parts may sandwich a plurality of plates of porous material stacked upon one another, and the mold parts may be heated to mold the porous material into the shape of the element body 61 shown in FIGS. 9 and 10. The plates of porous material, stacked upon one another and sandwiched by the mold parts, include a plate of porous material constituting the fine element layer 61a and a plate of porous material constituting the coarse element layer 61b.

In the present preferred embodiment, as shown in FIG. 10, regarding the periphery 61d of the element body 61, the change ratio of the thickness of the fine element layer 61a due to hot swaging (i.e. the original thickness divided by the thickness after hot swaging) is larger than the change ratio of the thickness of the coarse element layer 61b due to hot swaging.

As discussed below, when the support frame 55 is located inside the element body 61, the outer frame 56 of the support frame 55, described below, is located adjacent the periphery 61d of the element body 61. As the periphery 61d of the element body 61 has a smaller thickness than the other portions thereof, as discussed above, the periphery 61d of the element body 61 which the outer frame 56 is located in has a smaller size.

The seal 62 is fixed to the peripheral edge of the element body 61 by an adhesive. The seal 62 may be made of, for example, a porous material formed by foaming a resin material. The seal 62 seals the gap between the base 32 and element body 61 when the cleaner element 60 is attached to the base 32 of the mount 31. The seal 62 also has the function of holding the outer frame 56 of the support frame 55, described below, inside the element body 61. The seal 62 is pressed against the surrounding edge 33b of the opening 33a of the lead-in duct 33 by the outer frame 56 of the support frame 55. In this way, the cleaner element 60 covers the opening 33a. The surrounding edge 33b is the portions of a component that surround the opening 33a, where the component may be the lead-in duct 33 or base 32.

The seal 62 includes a seal body 62a having the shape of a flat plate connected with the peripheral edge of the element body 61, and a holding portion 62b configured to hold the outer frame 56 of the support frame 55, described below, in a gap between the element body 61 and itself. Unlike the element body 61, the seal 62 is not treated by a foam-removing process.

Figure 11:
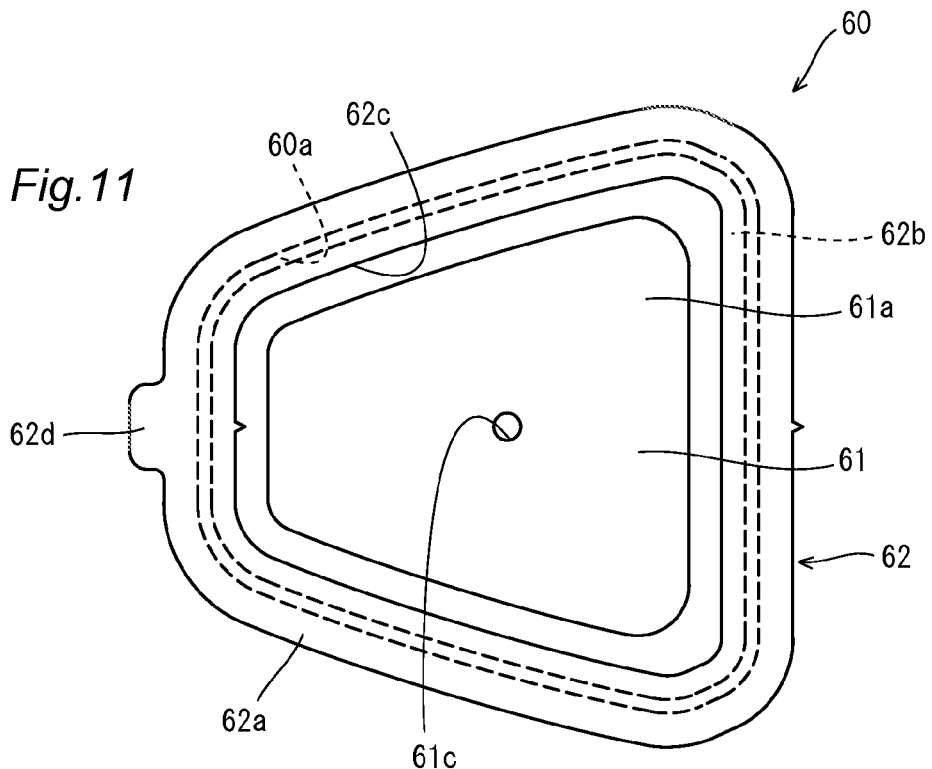
FIG. 11 is a bottom view of the cleaner element.

The seal body 62a preferably is a flat plate of porous material that is trapezoidal or substantially trapezoidal in a plan view. Outer portions of one surface of the seal body 62a are fixed to the peripheral edge of the element body 61 by an adhesive (indicated by "x" in FIG. 10). As shown in FIG. 11, a trapezoidal or substantially trapezoidal aperture 62c similar to the outline of the seal body 62a is provided in the center of the seal body. In other words, the seal body 62a has the shape of a frame. The aperture 62c constitutes part of the passage of air that has been filtered by the element body 62a and is flowing toward the throttle body 41.

As the seal body 62a of the above shape is fixed to the peripheral edge of the element body 61, the convex element body 61 is prevented from being deformed. As discussed above, the element body 61 is made convex by hot swaging, and thus tends to return to its original shape of a flat plate, i.e. to be deformed. As the seal body 62a is fixed to the peripheral edge of the element body 61, the element body 61 may be kept convex as shown in FIGS. 9 and 10.

As shown in FIGS. 10 and 11, the seal body 62a further includes a projection 62d used to bring the cleaner element 60 into place on the base 32 of the mount 31. The projection 62d is located at a front portion of the cleaner element 60 when the cleaner element 60 is attached to the base 32 of the mount 31.

The holding portion 62b is a ring that is provided on inner portions of the side of the frame-shaped seal body 62 that faces the element body 61. The holding portion 62b is a cylindrical member with one edge fixed to the seal body 62a by an adhesive so as to define, in combination with the inner surface of the element body 61, a groove 60a configured to accommodate the outer frame 56 of the support frame 55, described below (indicated by "x" in FIG. 10).

Figure 12:
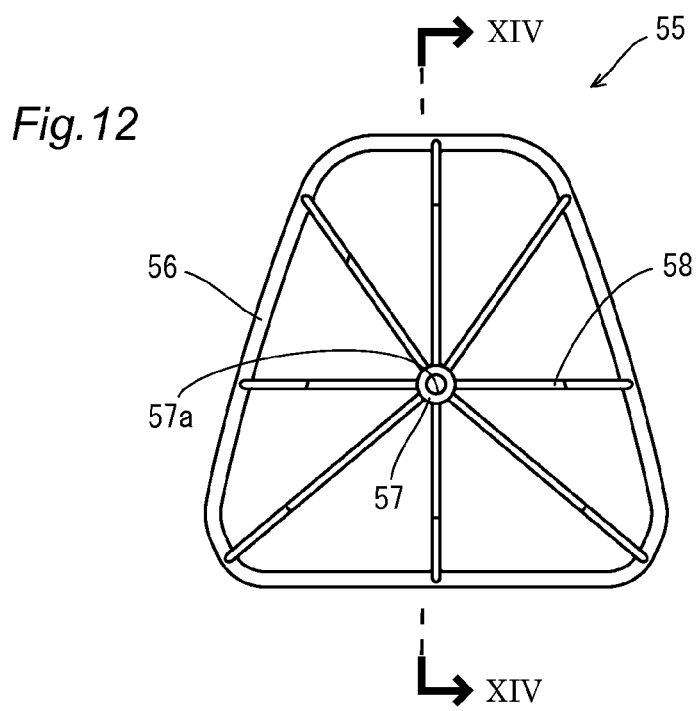
FIG. 12 is a top view of the support frame.
Figure 13:
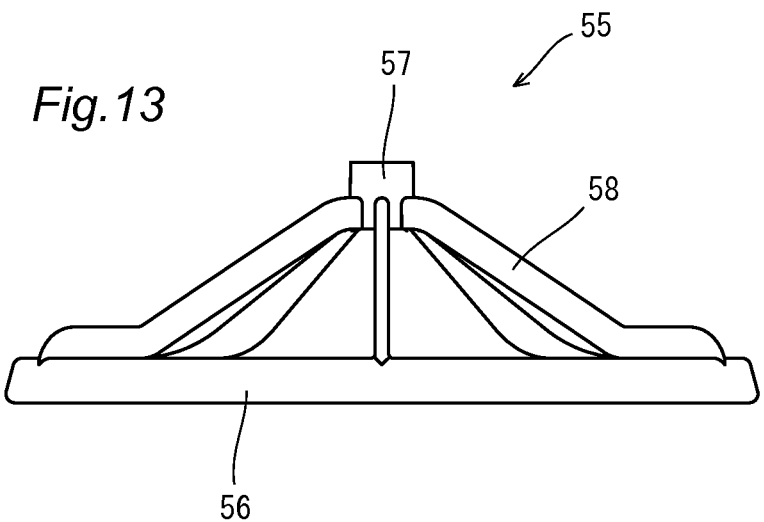
FIG. 13 is a side view of the support frame.

The cleaner element 60 is held on the base 32 of the mount 31 by the support frame 55. As shown in FIG. 12, the support frame 55 preferably is a trapezoidal or substantially trapezoidal frame in a plan view, similar to the cleaner element. As shown in FIG. 13, the support frame 55 is convex protruding from one side, similar to the cleaner element 60. In the present preferred embodiment, as shown in FIG. 5, the support frame 55 is located inside the cleaner element 60 such that the cleaner element 60 is held by the support frame 55 from inside.

As shown in FIG. 12, the support frame 55 includes a trapezoidal or substantially trapezoidal outer frame 56, an attachment member 57 through which the bolt 73 passes to be fastened to the frame support portion 32b of the base 32, and a plurality of support members 58 to connect the outer frame 56 with the attachment member 57. When the outer frame 56 is located inside the periphery 61d of the cleaner element 60, the support frame 55 holds the inner surface of the cleaner element 60 with the support members 58.

Figure 14:
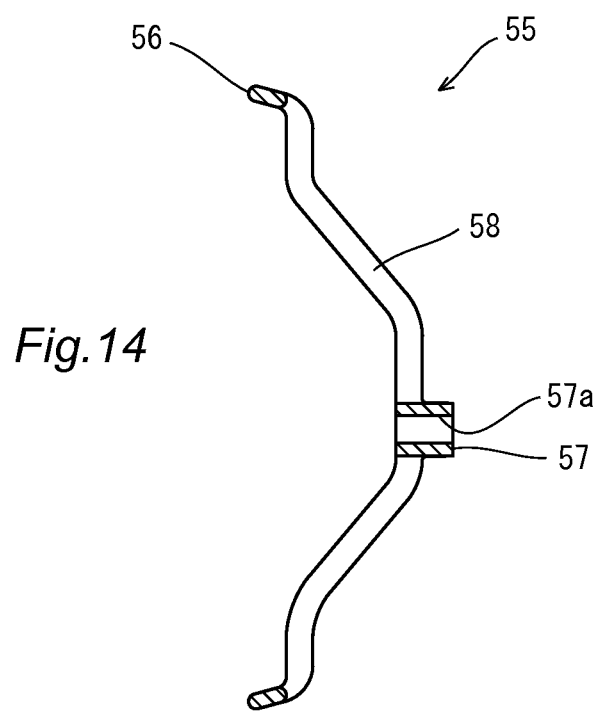
FIG. 14 is a cross-sectional view of the support frame taken on line XIV-XIV of FIG. 12.

As shown in FIGS. 12 and 14, the outer frame 56 has an oval cross section, and is trapezoidal or substantially trapezoidal in a plan view. As shown in FIG. 5, the outer frame 56 is located in the groove 60a provided on the inner surface of the cleaner element 60. That is, the outer frame 56 has a width that is equal or is substantially equal to the width of the groove 60a of the cleaner element 60. The outer frame 56 has a height that is equal or substantially equal to the length of the holding portion 62b of the seal 62 as measured in a direction of the cylinder axis.

As shown in FIGS. 12 and 13, the attachment member 57 is cylindrical or substantially cylindrical and is located in the center of the region inside the outer frame 56 as viewed from above. As shown in FIGS. 13 and 14, the attachment member 57 is displaced in one direction from the outer frame 56 as viewed from a side of the support frame. The attachment member 57 is supported by a number of the support members 58 on the outer frame 56. The attachment member 57 has a through-hole 57a through which the bolt 73 can pass.

Each support member 58 is a beam that connects the outer frame 56 with the attachment member 57. The support members 58 are connected with the attachment member 57 at locations along its circumference (for example, 8 locations in the present preferred embodiment). The support members 58 support the attachment member 57 on the outer frame 56. Moreover, as a plurality of support members 58 support the attachment member 57, gaps are provided between the support members 58 to allow air to flow therethrough.

As shown in FIG. 5, the support frame 55 with the above construction is attached to the inner surface of the cleaner element 60 such that the outer frame 56 is located in the groove 60a of the cleaner element 60 and the support members 58 support the inner surface of the cleaner element 60. Then, the support frame 55 and cleaner element 60 are placed on the base 32 of the mount 31. The support frame 55 and cleaner element 60 are fixed to the frame support portion 32b of the base 32 by the bolt 73 that passes through the through-hole 61c of the cleaner element 60 and the through-hole 57a of the support frame 55. When the bolt 73 is fastened to the frame support portion 32b of the base 32, the element body 61 of the cleaner element 60 is sandwiched by the bolt 73 and the frame support portion 32b to be compressed in a thickness direction. The compressed portion of the element body 61 is the fixing portion 61e of the element body. The fixing portion 61e is located in the center of the element body 61 as viewed from above.

Thus, the support frame 55 and cleaner element 60 are fixed to the mount 31 while the fastening power of the bolt 73 to the frame support portion 32b is transmitted to the outer frame 56 via the support members 58 of the support frame 55. As such, the seal 62 of the cleaner element 60 is pressed against the base 32 of the mount 31 by the support frame 55, thus significantly reducing or minimizing the size of the gap between the cleaner element 60 and the base 32.

In the present preferred embodiment, a motorcycle 1 preferably includes an engine 3; a lead-in duct 33 including one end connected with the engine 3 and another end including an opening 33a; an air cleaner case 30a connected with the opening 33a of the lead-in duct 33; a convex cleaner element 60 protruding in the direction opposite the direction toward the lead-in duct 33, the cleaner element located in the air cleaner case 30a and covering the opening 33a; and a support frame 55 that supports the cleaner element 60. The cleaner element 60 includes a convex element body 61 and a seal 62 protruding from the periphery 61d of the element body 61 toward the inner side of the element body 61. The support frame 55 includes an outer frame 56 contacting the periphery 61d of the element body 61 that pushes the seal 62 onto the surrounding edge of the opening 33a of the air cleaner case 30a. The periphery 61d of the element body 61 has a thickness smaller than that of the portions of the element body 61 that are located inward of the outer frame 56 as viewed in a direction of the protrusion of the element body.

Thus, the outer frame 56 of the support frame 55 is located outward of the opening 33a of the lead-in duct 33. The periphery 61d of the convex element body 61, that is to be contacted by the outer frame 56 of the support frame 55, has a thickness smaller than the thickness of the portions of the element body 61 that are located inward of the outer frame 56 as viewed in a direction of the protrusion of the element body. Thus, even if a convex cleaner element 60 is used, the increase in the size of the outline of the air cleaner case 30a is prevented while maintaining a certain opening area of the opening 33a of the lead-in duct 33. Moreover, the periphery 61d of the element body 61, adjacent to which the outer frame 56 of the support frame 55 is located, also has the function of cleaning air. Thus, the size of the air cleaner 30 is significantly reduced while maintaining a certain air cleaning functionality of the air cleaner.

In the present preferred embodiment, the motorcycle further includes a head pipe 23; a left and right main frames 20, to the left and right, extending rearward from the head pipe 23; and a fuel tank 10 supported by the left and right main frames 20. The engine 3 is supported by the left and right main frames 20. The air cleaner case 30a is located between the head pipe 23 and the fuel tank 10. The opening 33a is located between the left and right main frames 20. The cleaner element 60 is larger than the opening 33a in a plan view.

In the motorcycle 1 with the above configuration, the opening 33a of the lead-in duct 33 is located between the left and right main frames 20. As such, there are limitations on the size of the opening 33a of the lead-in duct 33, even when one attempts to increase it. Further, even when the lead-in duct 33 has an opening 33a that is as large as possible, the engine performance may decrease if a portion of the cleaner element 60 (for example, the seal 62) blocks a portion of the opening.

Further, the air cleaner case 30a is located between the head pipe 23 and fuel tank 10. Thus, if the size of the outline of the air cleaner case 30a is increased, this results in a smaller capacity of the fuel tank 10 as measured in a front-to-rear direction with respect to the vehicle. Furthermore, the size of the air cleaner and fuel tank 10 measured in a vehicle width direction is increased, making the feet of the rider feel uncomfortable.

Under these restrictions on the position of the air cleaner 30, the thickness of the periphery 61d of the cleaner element 60 may be smaller than the thickness of the portions of the element located inward of the outer frame 56, as in the arrangement described above, in order to reduce the size of the air cleaner 30 while keeping the opening area of the opening 33a as large as possible.

In the present preferred embodiment, the seal preferably includes a holding portion that works together with the periphery of the element body to hold the outer frame. Thus, the cleaner element 60 is attached to the support frame 55 in a simple manner. Consequently, the cleaner element 60 is capable of being replaced in a simple manner.

In the present preferred embodiment, the element body 61 preferably is defined by a single component including the periphery 61d and the other portions of the element body. Thus, the periphery 61d of the element body 61, adjacent to which the outer frame 56 of the support frame 55 is located, may be formed without an additional step of bonding, for example. Further, in implementations where the periphery is formed by a separate member, a separate mold must be fabricated. In contrast, forming the periphery and the other portions of the element body as a single component, as described above, will result in a reduced cost of fabricating molds.

In the present preferred embodiment, the air cleaner 30 further includes a mount 31 fixed to the body frame 2. The element body 61 includes a fixing portion 61e fixed to the mount 31 together with the support frame 55. The periphery 61 of the element body 61 has a smaller thickness than the portions thereof other than itself and the fixing portion 61e when the element body 61, together with the support frame 55, is fixed to the mount 31.

As the periphery 61d of the element body 61 has a smaller thickness than that of the portions thereof other than itself and the fixing portion 61e of the element body 61, the size of the cleaner element 60 as measured when the cleaner element 60 is supported by the support frame 55 is significantly reduced.

In the present preferred embodiment, the air cleaner 30 includes an air induction cover 35 covering the cleaner element 60. The air induction cover 35 includes a cover body 36 defining an accommodation space S to accommodate the cleaner element 60; and an induction duct 37 or 38 configured to forward air that has been taken in into the accommodation space S. The induction duct 37 or 38 includes an inlet port 37a or 38a with an opening located forward of the cover body 36 with respect to the vehicle.

Typically, in implementations where air is taken in from the front of the vehicle, the air cleaner 30 is located forward of the engine 3 with respect to the vehicle. Thus, the air cleaner 30 must be positioned in an area that only has a small space. In such implementations, an air cleaner of a small size may be advantageously realized without reducing the air cleaning functionality of the air cleaner 30 if the periphery 61d of the element body 61, adjacent to which the outer frame 56 of the support frame 55 is located, has a smaller thickness than that of the outer portions of the element body.

In the present preferred embodiment, the body frame 2 includes the head pipe 23 and the pair of main frames 20 extending from the head pipe 23 rearward with respect to the vehicle and arranged in a vehicle width direction. At least a portion of the air cleaner 30 is located between the main frames 20.

Thus, a small air cleaner 30 is provided on the main frames 20.

In the present preferred embodiment, the cleaner element 60 preferably is trapezoidal or substantially trapezoidal, as viewed from above the vehicle, including oblique sides located along the sides of the vehicle and having a dimension as measured in a vehicle width direction increasing as it goes rearward with respect to the vehicle. Thus, a cleaner element 60 with a surface area that is as large as possible is disposed in the gap between the pair of main frames 20. This provides a cleaner element with a small size while ensuring a certain air cleaning functionality.

In the present preferred embodiment, a pair of induction ducts 37 and 38 are arranged in a vehicle width direction as viewed from above the vehicle. As viewed from above the vehicle, each of the pair of induction ducts 37 and 38 is connected with one or the other side of the cover body 36 such that one induction duct 37 is opened toward one oblique side of the cleaner element 60 and the other induction duct 38 is opened toward the other oblique side of the cleaner element 60.

Thus, air is effectively taken in using a pair of induction ducts 37 and 38 and guided effectively toward the cleaner element 60.

In the present preferred embodiment, the element body 61 preferably is made of a porous material. Thus, the entire element body 61 has the function of cleaning air. This will improve the air cleaning functionality of the air cleaner compared with implementations where a portion of the element body 61 is made of a material other than a porous material.

In the present preferred embodiment, the element body 61 includes a plurality of element layers including a fine element layer 61a and a coarse element layer 61b having a larger mesh than the fine element layer 61a. The fine element layer 61a is located inward with respect to the element body 61 and is thicker than the coarse element layer 61b.

Thus, air taken in by the cleaner element 60 is cleaned more effectively.

In the present preferred embodiment, the periphery 61d of the element body 61 preferably is formed by hot swaging so as to have a thickness smaller than that of the other portions of the element body. Thus, the periphery 61d of the element body 61 is easily formed in a simple manner.

Other Preferred Embodiments

While preferred embodiments of the present invention have been described, the above preferred embodiments are merely examples that may be used to carry out the present invention. Thus, the present invention is not limited to the above preferred embodiments, and the above preferred embodiment may be modified as necessary without departing from the spirit of the present invention.

In the preferred embodiments described above, the inventive configuration of the air cleaner 30 is preferably used in an arrangement that takes in air from a region in front of the engine 3 and discharges gases rearward. Alternatively, the inventive configuration of the air cleaner 30 may be provided in an arrangement that takes in air from a region rearward of the engine 3 and discharges gases forward. Further, the air cleaner 30 preferably is located between the head pipe 23 and seat 9. Alternatively, the air cleaner 30 may be located elsewhere.

In the preferred embodiments described above, the air cleaner 30 preferably includes right and left induction ducts 37 and 38. Alternatively, only one induction duct may be provided, or three or more induction ducts may be provided.

In the preferred embodiments described above, the element body 61 preferably includes fine and coarse element layers 61a and 61b. Alternatively, the element body 61 may include one or three or more element layers.

In the preferred embodiments described above, the cleaner element 60 preferably is trapezoidal or substantially trapezoidal as viewed from above. Alternatively, the cleaner element may have other shapes.

In the preferred embodiments illustrated above, the element body 61 preferably is made convex by hot swaging. Alternatively, the element body 61 may be made convex by other techniques.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle-type vehicle comprising:
   an engine;
   a lead-in duct including a first end connected with the engine and a second end including an opening;
   an air cleaner case connected with the opening of the lead-in duct;
   a convex cleaner element protruding in a direction opposite to a direction extending toward the lead-in duct, the cleaner element being located in the air cleaner case and covering the opening; and
   a support frame configured to support the cleaner element; wherein
   the cleaner element includes:
      a convex element body; and
      a seal protruding from a periphery of the element body toward an inner side of the element body;
   the support frame includes an outer frame contacting the periphery of the element body to push the seal onto a surrounding edge of the opening; and
   the periphery of the element body has a thickness smaller than that of portions of the element body that are located inward of the outer frame as viewed in a direction of a protrusion of the element body.

2. The straddle-type vehicle according to claim 1, further comprising:
   a head pipe;
   left and right main frames extending rearward from the head pipe; and
   a fuel tank supported by the left and right main frames; wherein
   the engine is supported by the left and right main frames;
   the air cleaner case is located between the head pipe and the fuel tank;
   the opening is located between the left and right main frames; and
   the cleaner element is larger than the opening in a plan view.

3. The straddle-type vehicle according to claim 2, wherein the cleaner element is trapezoidal or substantially trapezoidal as viewed from above the vehicle, includes oblique sides located along sides of the vehicle and has a dimension as measured in a vehicle width direction increasing in a rearward direction with respect to the vehicle.

4. The straddle-type vehicle according to claim 3, wherein
   a pair of induction ducts are arranged in a vehicle width direction as viewed from above the vehicle; and
   as viewed from above the vehicle, each of the pair of induction ducts is connected with one or another side of the cover body such that one induction duct is opened toward one oblique side of the cleaner element and another induction duct is opened toward another oblique side of the cleaner element.

5. The straddle-type vehicle according to claim 1, wherein the seal includes a holding portion that cooperates with the periphery of the element body to hold the outer frame.

6. The straddle-type vehicle according to claim 1, wherein the element body is a single component including the periphery and the portions of the element body that are located inward of the outer frame.

7. The straddle-type vehicle according to claim 1, wherein the air cleaner case includes a mount;
the element body includes a fixing portion fixed to the mount together with the support frame; and
the periphery of the element body has a smaller thickness than portions thereof other than itself and the fixing portion when the element body, together with the support frame, is fixed to the mount.

8. The straddle-type vehicle according to claim 1, wherein the air cleaner case includes an air induction cover covering the cleaner element;
the air induction cover includes:
a cover body defining an accommodation space that accommodates the cleaner element; and
an induction duct configured to forward air into the accommodation space; wherein
the induction duct includes an inlet port with an opening located forward of the cover body with respect to the vehicle.

9. The straddle-type vehicle according to claim 1, wherein the element body is made of a porous material.

10. The straddle-type vehicle according to claim 9, wherein
the element body includes a plurality of element layers including a fine element layer and a coarse element layer having a larger mesh than the fine element layer; and
the fine element layer is located inward with respect to the element body and is thicker than the coarse element layer.

11. A method of manufacturing the straddle-type vehicle according to claim 1, wherein the periphery of the element body is formed by hot swaging so as to have a thickness smaller than that of other portions of the element body.

* * * * *